United States Patent
Hoekman et al.

(10) Patent No.: US 10,351,470 B2
(45) Date of Patent: Jul. 16, 2019

(54) METHOD FOR APPLYING A COLD END COATING INTEGRATED IN GLASS CONTAINER MANUFACTURING PROCESS

(71) Applicant: Arkema Vlissingen B. V., Vlissingen Oost (NL)

(72) Inventors: Leendert Cornelis Hoekman, Goes (NL); Carmela Maria Concetta Starrantino, Koewacht (NL); Joannes Theodorus Maria Wagemakers, KA Doetinchem (NL); Oliver Meurer, Allemagne (DE)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/399,667

(22) PCT Filed: May 7, 2013

(86) PCT No.: PCT/EP2013/059431
§ 371 (c)(1),
(2) Date: Nov. 7, 2014

(87) PCT Pub. No.: WO2013/167558
PCT Pub. Date: Nov. 14, 2013

(65) Prior Publication Data
US 2015/0108078 A1 Apr. 23, 2015

Related U.S. Application Data

(60) Provisional application No. 61/655,603, filed on Jun. 5, 2012.

(30) Foreign Application Priority Data

May 9, 2012 (EP) .................................... 12167331

(51) Int. Cl.
*B05B 13/04* (2006.01)
*C03C 17/42* (2006.01)
(Continued)

(52) U.S. Cl.
CPC .......... *C03C 17/42* (2013.01); *B05B 13/0221* (2013.01); *B05B 13/0447* (2013.01);
(Continued)

(58) Field of Classification Search
USPC .......................................... 118/313–316, 324
See application file for complete search history.

(56) References Cited

U.S. PATENT DOCUMENTS 3,509,234 A 4/1970 Burlant et al.
3,509,852 A 5/1970 Wells
(Continued)

FOREIGN PATENT DOCUMENTS

GB 837322 A * 6/1960 ............. C03C 17/00
WO WO 91/19606 12/1991
(Continued)

Primary Examiner — Yewebdar T Tadesse
(74) Attorney, Agent, or Firm — Lynn B. Morreale (57) ABSTRACT

The present invention relates to a coating line and a method for applying a protective coating to hollow glass containers integrated in glass container manufacturing process. In particular it relates to a coating line and method for applying a cold end coating to hollow glass containers. More particularly the present invention relates to a coating line comprising horizontal spray guns for applying a cold end coating to hollow glass containers in a single line and such a method for applying a cold end coating to hollow glass containers.

12 Claims, 8 Drawing Sheets

(51) Int. Cl.
    *C03C 17/00*     (2006.01)
    *B05B 13/02*     (2006.01)
    *B05D 1/02*     (2006.01)
    *B05D 7/22*     (2006.01)
    *B65D 1/02*     (2006.01)

(52) U.S. Cl.
    CPC .............. *B05D 1/02* (2013.01); *B05D 7/227* (2013.01); *B65D 1/0215* (2013.01); *C03C 17/005* (2013.01); *B05B 13/0228* (2013.01); *C03C 2217/78* (2013.01); *C03C 2218/112* (2013.01); *C03C 2218/152* (2013.01)

(56) References Cited

U.S. PATENT DOCUMENTS

| | | | |
|---|---|---|---|
| 3,516,811 A | | 6/1970 | Gatchet et al. |
| 3,645,778 A | * | 2/1972 | Nesteruk ................ B05B 5/08 |
| | | | 427/477 |
| 3,926,103 A | | 12/1975 | Smith |
| 4,002,143 A | * | 1/1977 | Dover ...................... B05B 7/32 |
| | | | 118/314 |
| 4,425,868 A | * | 1/1984 | Shapiro ............... B05B 15/1214 |
| | | | 118/314 |
| 5,284,684 A | | 2/1994 | Scholes |
| 5,453,304 A | | 9/1995 | Scholes |

FOREIGN PATENT DOCUMENTS

| | | |
|---|---|---|
| WO | WO 95/17263 | 6/1995 |
| WO | WO 02/066389 A1 | 8/2002 |
| WO | WO 2005/049219 A1 | 6/2005 |

* cited by examiner

Figure 3 conveyer belt movement

Figure 4 a)
Top view

Figure 4 b)
Side view

METHOD FOR APPLYING A COLD END COATING INTEGRATED IN GLASS CONTAINER MANUFACTURING PROCESS

CROSS-REFERENCE TO RELATED APPLICATIONS

This application is a national stage application under 35 U.S.C. § 371 of PCT/EP2013/059431, filed May 7, 2013, which claims benefit to EP patent application EP 12167331.3, filed May 9, 2012 and U.S. patent application Ser. No. 61/655,603, filed Jun. 5, 2012.

FIELD OF THE INVENTION

The present invention relates to a coating line and a method for applying a protective coating to hollow glass containers integrated in glass container manufacturing process.

In particular it relates to a coating line and method for applying a cold end coating to hollow glass containers.

More particularly the present invention relates to a coating line comprising horizontal spray guns for applying a cold end coating to hollow glass containers in a single line and such a method for applying a cold end coating to hollow glass containers.

Technical Problem

Hollow glass containers are manufactured from molten glass at moulds at high temperatures. As the surface of these containers is fragile and in order to avoid damage (as scratches for example) they are surface coated directly after forming of the container. Also in order to preserve the strength of the glass and to prevent any direct glass to glass contact of the respective containers in order to avoid the before mentioned scratches, they are protected on the surface by a coating.

Nowadays in glass container manufacturing a two step coating is applied in order to obtain scratch resistance and slipperiness of the glass containers.

In the first step, the so called hot-end coating (HEC) is applied by means of chemical vapor deposition (CVD) of a metal containing compound on the freshly formed, hot and single or double line positioned glass containers.

Such a HEC is based on coating precursor that includes tin, titanium other heat decomposable metallic or organometallic compounds.

This application is done inside a so called coating tunnel or coating hood where the before mentioned hot end coating is applied by chemical vapor deposition in forming a thin layer of a metal oxide, for example tin oxide. The objective is to coat the outside of the glass container with a homogenous even layer except for the so called finish.

Since this is done in vapor phase and on single line conveyed glass containers, a homogeneous distribution can be achieved easily. The thin layer of metal oxide, often tin oxide, is the basis for the second coating, the so called cold-end coating (CEC). The cold-end coating could be a layer of polyethylene wax, which is applied via a water based emulsion. This makes the glass slippery, protecting it from scratching and avoiding the containers from sticking together when they are moved together on a conveyor. The resultant invisible combined coating gives a virtually unscratchable surface to the glass Only the combination of the hot-end coating and the cold-end coating will bring the desired qualities of scratch resistance and slipperiness.

The present invention deals with the second step, the application of cold end coating.

After the hot end coating application, the glass containers are usually submitted through a special type of oven called also annealing lehr. Latter is designed specifically for annealing glass and to cool down the containers in a controlled way. The glass is heated to the annealing point and then slowly cooled down. This process relieves the internal stresses, making the glass much more durable. The containers are now positioned in TOWS.

Traditionally the cold-end coating is applied when the containers leave the cooling oven. Since the containers are positioned in several rows, the application happens by spray gun or guns which moves parallel between the respective rows of the containers, positioned above or just between the rows at shoulder height of the containers. The spray pattern from the above coating application leads automatically to an inhomogeneous distribution of coating material.

In the case of a glass bottle as hollow glass container most of the applied material will be sprayed upon its shoulder area, and much less on the body area and heel area. Practice often deals with too much coating on the shoulder area where it has no function and even brings label adhesion problems in case of neck labels.

An objective of the present invention is to have an efficient distribution of the cold end coating material.

Another objective of the present invention is to have a coating line that can apply a cold end coating that is efficiently distributed on the to be protected surface of the container.

Still another objective of the present invention is a method to apply a cold end coating that is efficiently distributed on the to be protected surface of the container.

Again still another objective of the present invention is a coating line and a method to apply the cold end coating selectively at certain surface areas of the container.

[BACKGROUND OF THE INVENTION] PRIOR ART

The document U.S. Pat. No. 3,509,852,234 describes a glass container coating machine possessing a plurality of spray nozzles, which move from above between the rows of bottles transported by a conveyer belt. In fact the assembly has moving spray nozzles the move around the bottles in order to coat it completely.

The document WO2002/066389 describes an apparatus for applying a coating to a glass container. The hot end coating is applied inhomogeneous in order to apply the cold end coating to preferred zones. It is very difficult to control the exact application of the hot end coating, especially to exact zones and given thickness.

The document WO91/019606 describes a method for enhancing the strength of a glass container and strength enhanced glass containers. The coating station for the strength enhancing coating is located on a multiline conveyer configuration either between the lehr and the cold end coating spray station or after the cold end station. This strength enhancing coating in order to increase burst strength, is not a cold and coating.

The document WO2005/049219 describes a method, apparatus and coating liquid for coating returnable glass containers. The coating in this document is a protective coating applied to returnable containers after cleaning the containers and before refilling them. This method does not take place after the manufacturing of the glass containers.

BRIEF DESCRIPTION OF THE INVENTION

Surprisingly it has been found that an efficient distribution of the cold end coating material can be achieved when the coating is applied while the containers are on a single line conveyer belt.

Surprisingly it has also been found that an efficient distribution of the cold end coating material can be achieved by using two distinctive cold-end coating steps.

Surprisingly it has also been discovered that with a coating line for containers comprising
- a first cold end coating application
- a cold end coating application on a single line conveyer belt
- wherein the two respective cold end coatings are applied from at least two different directions with an angle of at least 45° between the two directions.

It has also been found that if the cold end coating on the single line conveyer belt is applied by means of spraying made by one or more spray guns that are positioned perpendicular towards the to be coated outer wall of the containers an efficient distribution of the cold end coating material is obtained.

It has also been found that temperature of the container during the second cold end coating application can be less then the temperature of the container during the first cold end coating application.

Additionally it has also been found that a selective distribution of the cold end coating material can be achieved when at least two spray guns are used during the second cold end coating application, each spray gun sprays on a different surface area of the container.

DETAILED DESCRIPTION OF THE INVENTION

According to a first aspect, the present invention relates to a coating line for containers coating line for containers comprising a cold end coating application wherein the cold end coating is applied when the containers are on a single line conveyer belt.

According to a second aspect, the present invention relates to a coating line for containers coating line for containers comprising
- a first cold end coating application
- a second cold end coating application when the containers are on a single line conveyer belt
- wherein the two respective cold end coatings are applied from at least two different directions with an angle of at least 45° between the two directions.

In a third aspect the present invention relates to a method for applying a coating on the surface of containers comprising the step of applying a cold end coating wherein the cold end coating is applied by spraying on a single line conveyer belt.

In a fourth aspect the present invention relates to a method for applying a coating on the surface of containers comprising the steps of
- applying a hot end coating
- applying first cold end coating
- applying second cold end coating when the containers are on a single line conveyer belt
- wherein the two respective cold end coatings are applied from at least two different directions with an angle of at least 45° between the two directions.

In a further aspect the present invention relates to a coating line wherein the temperature of the container during the second cold end coating application is less then 140°, preferably between 40 and 130° C.

According to another further aspect, the present invention relates to a coating line for containers coating line for containers comprising
- a first cold end coating application
- a second cold end coating application when the containers are on a single line conveyer belt
- wherein the two respective cold end coatings are applied from at least two different directions with an angle of at least 45° between the two directions and the cold end coatings are applied after the glass container manufacturing process.

According to another further aspect the quantity of the coating applied during the second cold end coating application is more important than the quantity of the coating applied during the first cold end coating application.

In still another aspect the present invention relates to a coating line according wherein the cold end coating is applied by means of spraying.

In an additional aspect the present invention relates to a coating line wherein the spraying during the cold end coating application when the containers are on a single line conveyer belt is made by one or more spray guns that are positioned perpendicular towards the to be coated outer wall of the containers.

In still an additional aspect the present invention relates to a coating line wherein the spray guns apply the cold end coating to a selective area of the container when the containers are on a single line conveyer belt.

In still an additional aspect the present invention relates to coating line wherein at least two spray guns are used during the cold end coating when the containers are on a single line conveyer belt and each spray gun sprays on a different zone of the container.

Still another aspect the present invention relates to a container at which has been applied a cold end coating by two distinctive steps, a first cold end coating application and a second cold end coating application wherein the temperature of the container during the second cold end coating application is less then the temperature during the first cold end coating application and the cold end coating is applied by means of spraying and the spraying during the second cold end coating application is made by one or more spray guns that are positioned perpendicular towards the to be coated outer wall of the containers.

By the term "coating line" as used is denoted an assembly of essential elements for coating the containers as there is a conveyer belt which transports the containers to the respective coating devices and the coating device it self.

By the term "container" as used is denoted a receptacle in which a liquid material can be held or carried.

By the term "different directions" as used is denoted that there is at least an angle of 45° between two different directions. For example from above and from right or left direction signifies an angle of 90°; from the left and the right side signifies an angle of 180°.

By the term "single line" as used is denoted that a container on the conveyor belt has only direct neighbored containers in the direction of the movement of the conveyor belt, meaning before and behind.

By the term "rows" as used is denoted that a container on the conveyor belt has not only direct neighbored glass containers in the direction of the movement of the conveyor belt, but also left and/or right of him in the direction of the movement of the conveyor belt.

By the term "hot-end coating" as used is denoted that the coating is applied on the hollow container at a temperature between 400° C. and 650° C.

By the term "cold-end coating" as used is denoted that the glass container is coated at a temperature of the container less then 150° C.

By the term "spray" as used is denoted a dispersion of liquid droplets dispersed in a gas as a continuous phase.

By the terms "spray gun" or "spray nozzle" as used is denoted a device that generates the spray for distributing the spray over an area.

By the term "spray pattern" as used is denoted the area on which the liquid droplets make contact to the surface of the container.

FIGURES

FIG. 4: more detailed view of cold end coating application (18) in a single line configuration: FIG. 4a with top view including the transfer of the containers (1) to a single conveyer belt (13) before applying the cold end coating in form of a spray (6) with spray nozzles (7) from both sides. FIG. 4b with side view where the container (1) on the single line conveyer belt (13) is coated with a spray (6) by one spray nozzle (7) from each side.

FIG. 6: two perpendicular spray nozzles (7) applying a spray (6) with a spray angle (10) at two different position towards the to be coated surface (11) of the container (1), at an angle of 90° in FIG. 6a; and tilted at and angle (30) of 12° from the 90° C. position in FIG. 6b.

Figure 5:
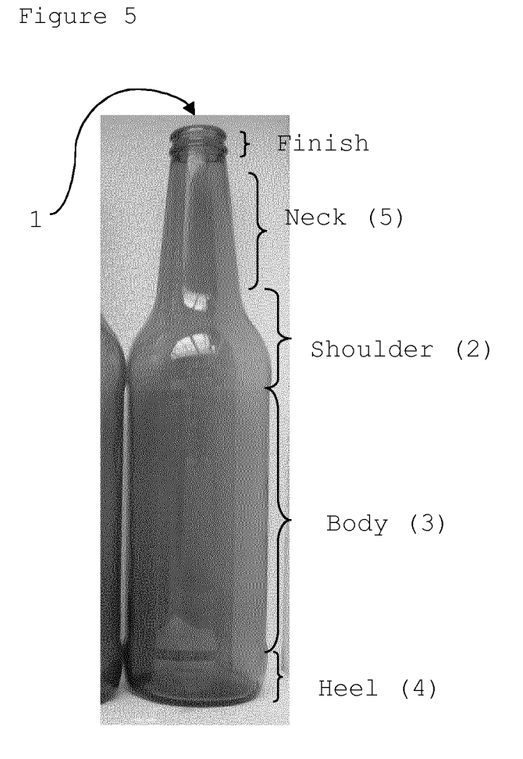
FIG. 5: hollow container (1) in form of a bottle with the shoulder (2), body (3) and heel zone (4). The finish and the neck (5) are indicated as well.

With regard to the container of the present invention, it could be made out of glass or plastic. Preferably the container is a glass container. More preferably the container is a hollow glass container. Example for hollow glass containers are bottles and jars. FIG. 5 shows a hollow container (1) in form of a bottle with three respective zones: shoulder (2), body (3) and heel (4).

With regard to the coating line according to the present invention it comprises certain elements. The essential elements of the coating line for coating the containers is a conveyer belt which transports the containers to the respective coating device or devices and the coating device or devices itself. In a preferred embodiment the coating line comprises two distinctive cold end coating applicator units.

Figure 1:
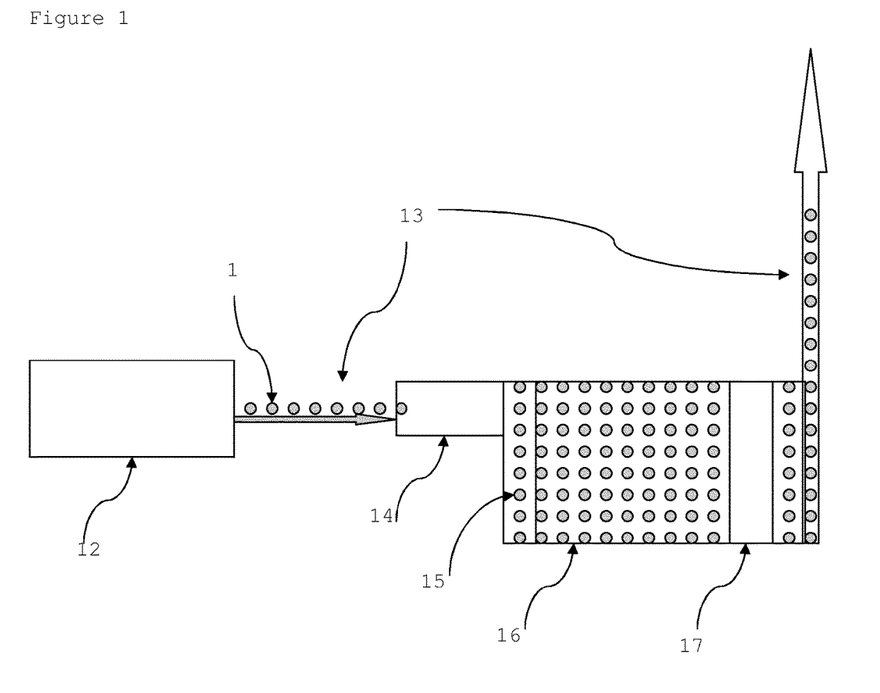
FIG. 1: schematic representation of coating process of glass containers (1) after the molding of the containers (12), a coating line comprising a conveyer belt which transports the containers in a single line (13), a hot end coating device (14) a change to a multiline/row arrangement (15) on a conveyer passing the annealing lehr (16), followed by the cold end application and return to a single line conveyer (13).

An example of a standard coating line for glass containers is given in FIG. 1. The schematic representation in FIG. 1 comprises a glass container production machine (12) that delivers the manufactured containers (1) for example bottles to a single line conveyer belt (13). The conveyer belt (13) transports the glass containers (1) through a hot end coating tunnel (14) still in a single line arrangement and afterwards by a converting unit in rows or multi lines (15) through an annealing lehr (16). Then the containers pass the cold-end coating unit (17) and are retaken again in a single line conveyer belt (13) and are passed on further (for inspection, packaging and labeling for example and not shown in FIG. 1).

Figure 2:
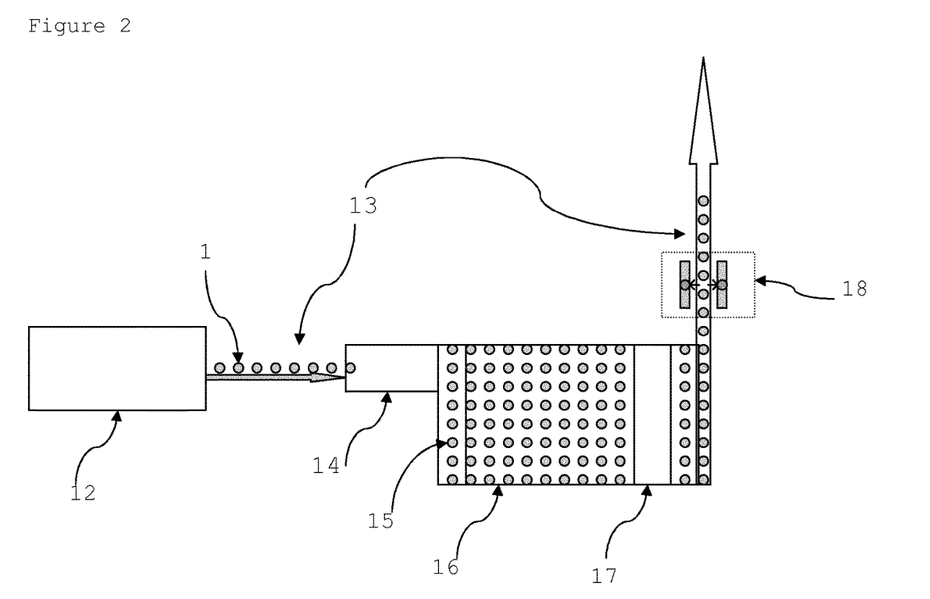
FIG. 2: schematic representation of coating process of glass containers according to the present invention comprising a second cold end coating application (18) in a single line.

A coating line according to the present invention comprising a cold end coating application wherein cold end coating is applied when the containers are on a single line conveyer belt is shown in FIG. 2. As represented exemplary in FIG. 2, in direct comparison to the coating line from FIG. 1, it comprises another cold end coating application meaning a second cold-end coating unit (18) in a single line conveyer belt configuration after the first cold end coating unit (17).

In a still preferred embodiment the coating line comprises two distinctive cold end coating applicator units and a hot end coating application.

Preferably the coating line according to the invention is located after the glass container manufacturing process. The glass containers are manufactured by molding and the coating line according to the invention is after said container molding in the glass container manufacturing plant.

With regard to the hot end coating applied by the hood or tunnel, it is a metal oxide. Preferable the coating is tin oxide or titanium oxide. The tin oxide is derived from the decomposition of an organic tin halogenide, advantageously from monobutyl tin chloride.

The hollow glass containers are transported in a single line by a conveyer through a tunnel formed in the hood. The coating compound is introduced in the hood with a mixture of air and forms the coating on the glass by decomposition at high temperature. By high temperature is meant between 400° C. and 650° C.

Figure 3:
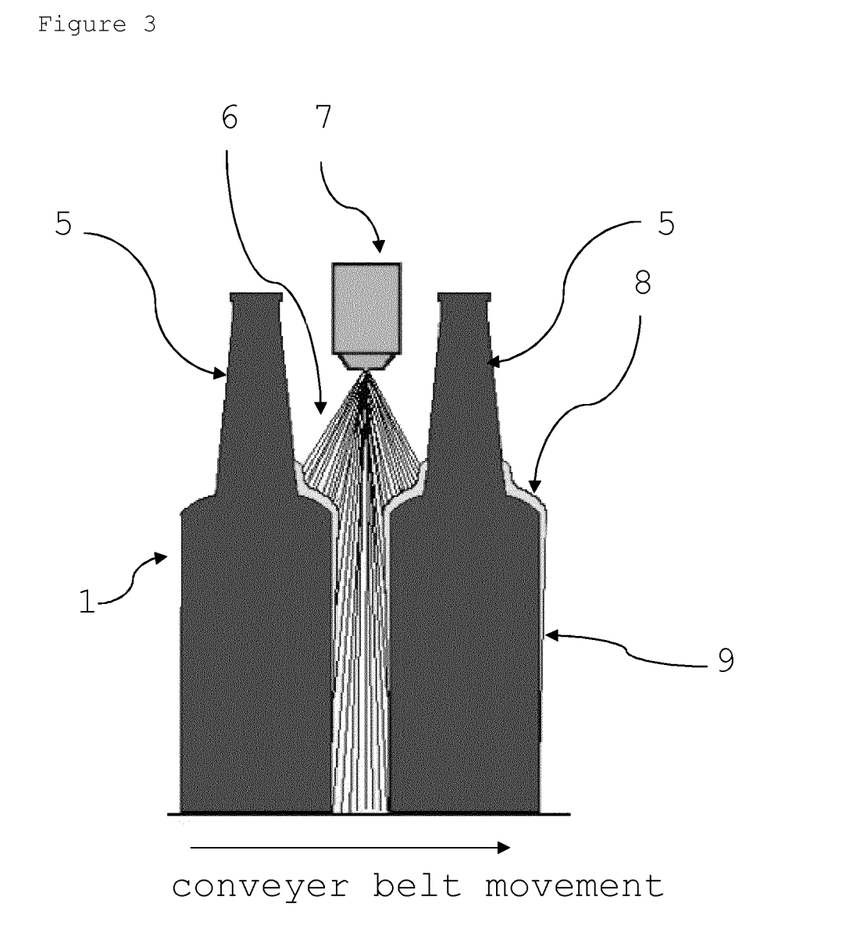
FIG. 3: schematic representation of the cold end coating application (17) from above in multiline/row arrangement. The hollow container (1) is coated with a spray (6) which is generated by a spray nozzle (7). The spray nozzle (7) is arranged between the necks (5) of the containers (1). Due to the spray pattern a thick coating (8) is applied at the shoulder zone while the coating gets thinner downwards the body (9).

With regard to the first cold end coating applied, it is applied from above on the containers. From above means that the spray direction more or less perpendicular towards the conveyers belt that transports the containers. The general principle is shown in FIG. 3. The hollow container (1) is coated with a spray (6) which is generated by a spray nozzle (7). The spray nozzle (7) is arranged between the necks (5) of the containers (1).

The temperature of containers during the application of the first cold end coating is less then 150° C. Preferably the temperature of the containers is between 80° C. and 150° C., more preferably between 100° C. and 140° C.

Preferable the first cold end coating is applied by spray guns or spray nozzles.

Figure 4:
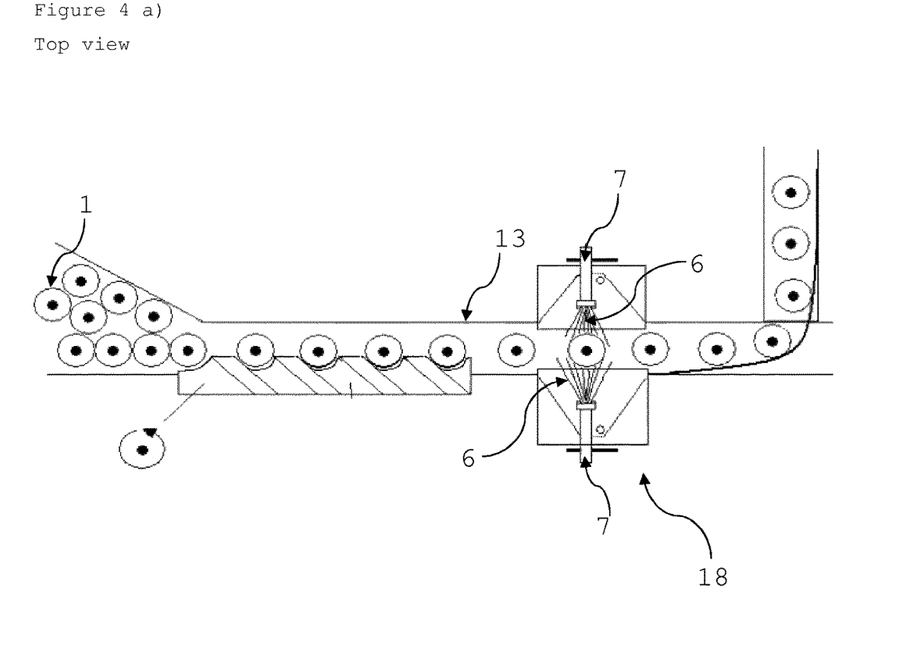

With regard to the cold end coating applied when the containers are on a single line conveyer belt, it is applied from the side on the containers on the single conveyor line. From the side means that the cold end coating applied by a coating applicator more or less perpendicular to the surface of the containers on the conveyer belt, as shown in FIG. 4, where the coating applicator is a spray gun. Perpendicular does not imply that the angle between the coating applicator and the surface or outer wall of the container is exactly 90°. The exact angle of the could vary some degrees from 90°. The angle between the coating applicator and the to be coated surface can be between 45° and 135°, preferable between 60° and 120°, more preferably between 70° and 110° and advantageously between 75° and 105°.

In the case that there is a first cold end coating application, from the side means that the cold end coating applied when the containers are on a single line conveyer belt (also called in that case the second cold end coating application), is applied from another direction as the first cold end coating. Another direction means that there is at least an angle of 45° between the two directions. For example the two directions from above and from the side imply an angle of about 90° C. between the two directions.

The first cold and coating and the second cold end coating are applied from at least two different directions. Generally speaking if the first cold and coating is applied from above of the containers the second cold end coating is applied from the side. The angle between the two directions is at least 45°, preferably at least 50° and more preferably at least 60° C.

The temperature of containers during the application of the cold end coating applied when the containers are on a single line conveyer belt is less then 150° C., preferably less then 140° C. Preferably the temperature of the containers is between 0° C. and 140° C., more preferably between 15° C. and 140° C., advantageously between 30° C. and 140° C. and more advantageously between 40° and 140° C. and even more advantageously between 40° C. and 130° C.

In a preferred embodiment the cold end coating applied when the containers are on a single line conveyer belt is applied by spraying.

According to the invention the quantity of the coating applied during the second cold end coating application is more important than the quantity of the coating applied during the first cold end coating application. The quantity ratio is to be taken on the selective coated area. If the second cold end coating application covers nearly the whole body as in FIG. 7a), the global quantity of the two coatings can be taken into account for the quantity ratio. If the second cold end coating application covers only certain areas as in FIG. 7b), the only the quantity of the first cold end coating applied to the shoulder and the heel can be taken into account for the quantity ratio.

Preferably more than 50 wt %, more preferably more than 60 wt % and advantageously more than 70 wt % of the cold end coating are applied when the containers are on a single line conveyer belt, on the selective coated area.

Preferably less than 50 wt %, more preferably less than 40 wt % and advantageously less than 30 wt % of the cold end coating are applied when the containers are not yet on a single line conveyer belt.

With regard to the application method according to the present invention, the cold end coating is applied by spraying.

The cold and coating applied when the containers are on a single line conveyer belt is applied by means of a spray guns or spray nozzles. One or more spray guns or spray nozzles can be used.

If only one spray gun is used either the spray gun rotates around the bottle or the bottle is rotated with a fixed spray gun. It is preferred that the bottle rotates if there is only one spray gun or spray nozzle.

If there are two or more spray guns the respective spray guns can be installed in opposite positions in order to apply the coating on the glass container from the opposite sides. FIG. 4 shows an embodiment with two spray guns (7) positioned at opposite sides of the container (1) and the conveyer belt (13) that transports the container in a single line.

The cold end coating application method according to the invention requires no electrostatic charge.

Figure 7:
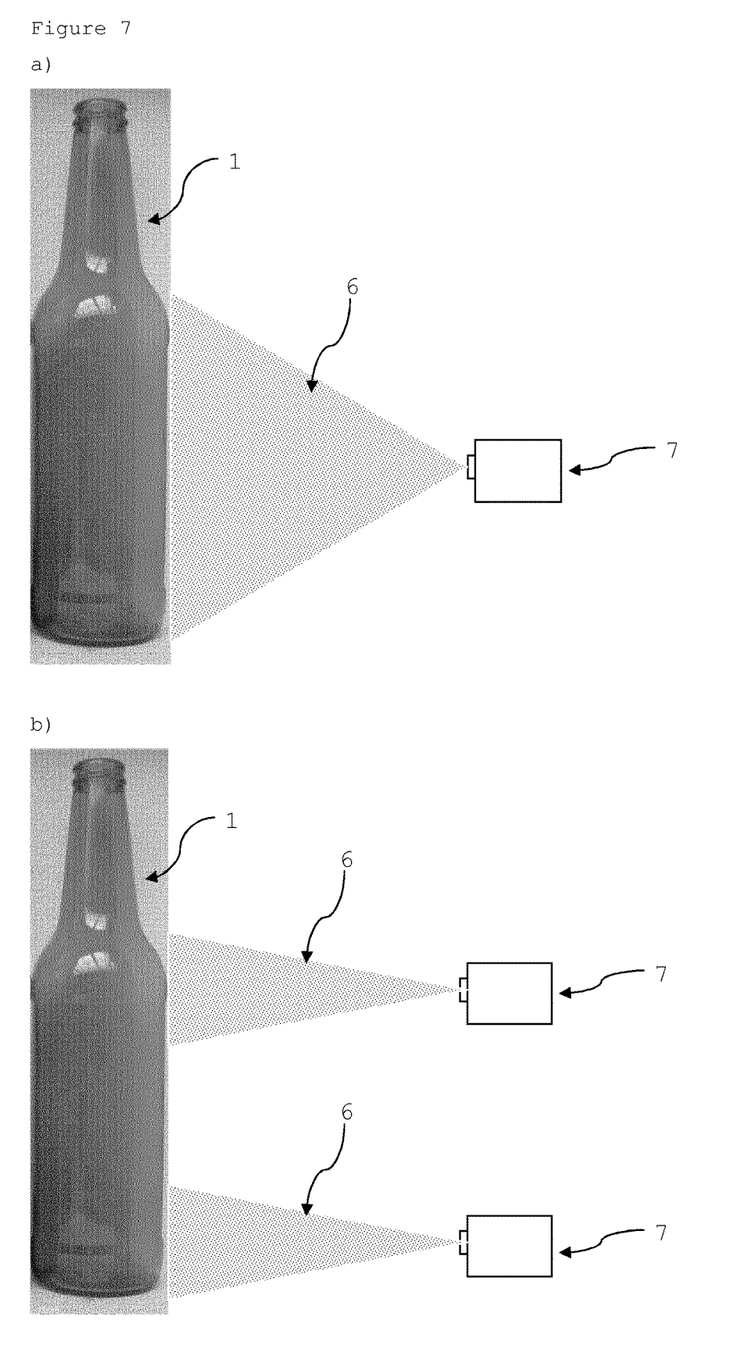
FIG. 7a): coating application on a container (1) of a spray (6) by a spray nozzle (7) covering shoulder (2), body (3) and heel (4) at the same time.
FIG. 7b): selective coating application on a container (1) of a spray (6) by a two spray nozzles (7) covering shoulder (2) and heel (4).
Figure 8:
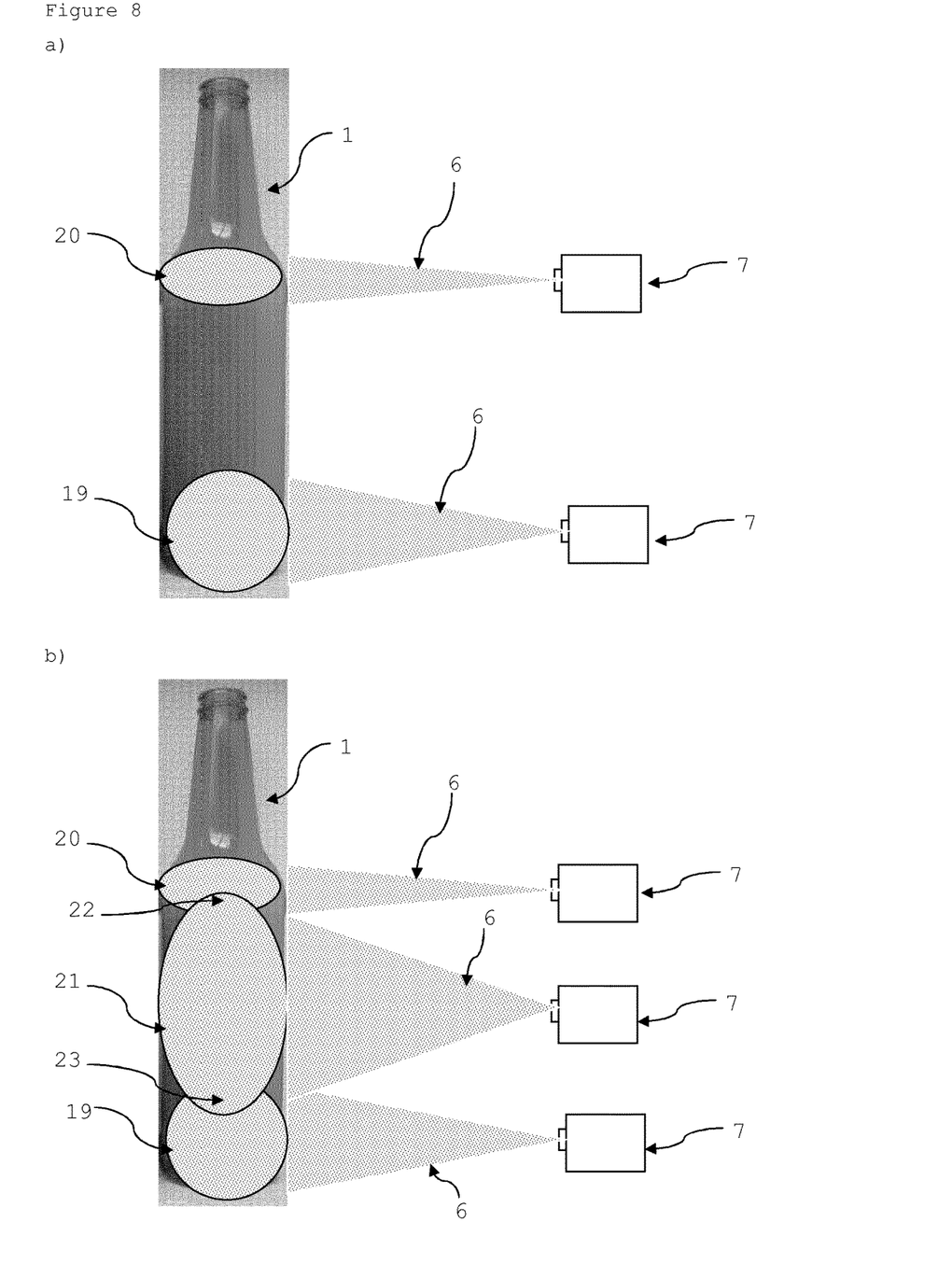
FIG. 8a): selective coating application on a container (1) of a spray (6) by a two spray nozzles (7) covering shoulder (2) and heel (4) while using different spray patterns (19 and 20) for each selective area. The spray pattern (20) on the shoulder (2) is horizontal flat pattern, while the spray pattern (19) on the heel (4) is a round pattern.
FIG. 8b): coating application on a container (1) of a spray (6) by a three spray nozzles (7) covering shoulder (2), body (3) and heel (4) while using different spray patterns (19, 20 and 21) for each selective area. The spray pattern (21) on the body is a vertical flat pattern. Between each selective area are overlapping zones (22 and 23).

With regard to the selective application of the cold end coating material on selective areas, in another embodiment two or more spray guns are installed on same side of the container and the single conveyer belt and each spray gun applies the coating to selective areas of the container as shown in FIGS. 7b) and 8. For example a first spray gun applies the coating to the shoulder (20), a second spray gun applies the coating to the body (21) and the third spray gun applies the coating to the heel (19). An overlapping of the coating at the borders (22 and 23) of the selective areas will arrive.

Each spray gun can apply a different quantity of coating and use a different spray pattern. A different quantity of coating would mean that the coating quantity in mg/cm2 on the surface could be different on function of the coating areas. For instance the coating quantity at the shoulder (2) and heel (4) can be more important then at the body (3).

In order to apply the coating homogenously in each respective area the container could be rotated.

In still another embodiment two or more spray guns are installed on each side of the container and the single line conveyer belt and each spray gun applies the coating to selective areas of the container from both opposite sides similar as shown in FIG. 4b), but with spray gun or nozzle positions similar to FIG. 8.

It is possible to apply for example much less or no coating on the body (3) of the container. For example FIGS. 7b) and 8a) shows an embodiment where no coating is applied at the body.

It is possible to use different spray patterns for the selective zones. For example FIG. 8a) shows different spray patterns for the shoulder and the heel: the heel is coated with a round pattern (19), while the shoulder is coated with a flat horizontal pattern (20). For example FIG. 8b) shows additionally a horizontal flat pattern for the body (21).

In still another embodiment it possible to apply different concentrations or different products on selective areas, while using two or more spray guns. For example the three areas coated by the distinctive spray patterns (19), (20) and (21) can have different coating products or different concentrations of the same or different coating. For example FIG. 8b): the heel area pattern (19) and the shoulder area pattern (20) are coated with a higher concentration while the body pattern area (21) is coated with a smaller concentration. Consequently a gradient of the coating on the container surface is obtained.

In one preferred embodiment for the selective area cold end coating application the shoulder area (2) and the heel area (4) are coated while no coating is applied to the body area (3), as shown in FIG. 7b) and FIG. 8a). Not applying any coating does not mean that there is no coating at all at the body, especially as there is an overlapping between the coatings of the different areas. If the shoulder and the body are coated with a minimum coating thickness it cannot be avoided that at least a part of the coating is also applied at the body area close to the shoulder and body area.

With regard to the position of the spray gun or guns of the first cold end coating application, they are essentially positioned vertical above the to be coated containers, as shown in FIG. 3. By vertical is has to be understood that the spray gun is not mounted exactly perpendicular to the conveyer belt. The spray can be also be slightly tilted.

Figure 6:
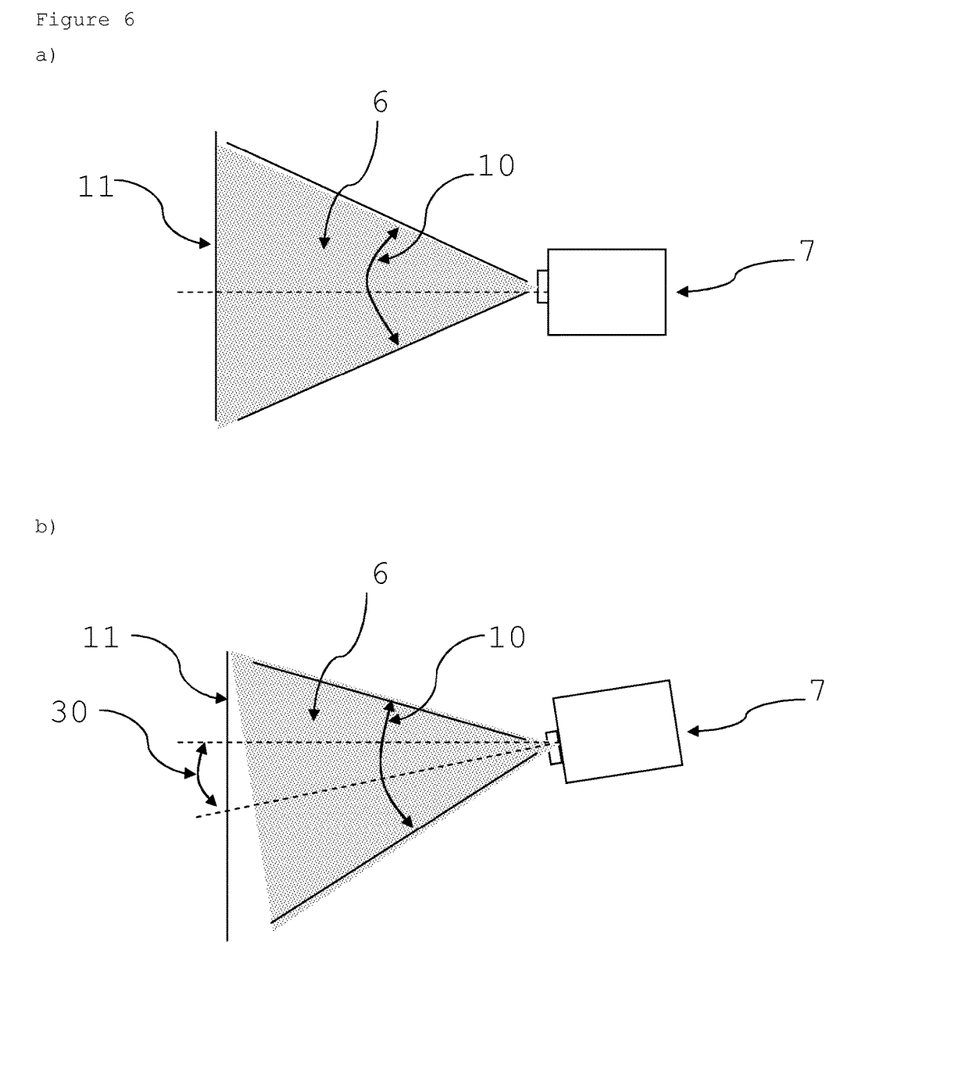

With regard to the position of the spray gun or guns of the d cold end coating application applied when the containers are on a single line conveyer belt, they are essentially positioned perpendicular towards the to be coated outer wall of the containers. Perpendicular does not imply that the angle between the spray gun and the surface or outer wall of the glass container is exactly 90°. The exact angle of the spray gun could vary some degrees from 90°. The angle between the spray gun and the to be coated surface can be between 45° and 135°, preferable between 60° and 120°, more preferably between 70° and 110° and advantageously between 75° and 105°. This is illustrated in FIG. 6, where two different positions of the spray guns are illustrated. In FIG. 6a) the angle between the spray gun (7) and the surface or outer wall of the glass container (11) is exactly 90°, while in FIG. 6b) the angle between the spray gun (7) and the surface or outer wall of the glass container (11) is tilted with an angle (30) of about 12° from the perpendicular position. This means that the angle between the spray gun and the to be coated surface in FIG. 6b is 78° from above and 102° from below. The spray angle (10) in both FIGS. 6a and 6b is the same of about 50°.

The distance between the surface of the glass container and the exit of the spray gun is depending on the spray angle, on the desired to be coated area and on the container or container size. Preferably the distance is at least 1 cm.

Spray angle can vary between 30° and 120°, depending on the height of the container, the distance between the spray gun and the to be coated surface and if only a certain selective zone should be coated.

With regard to the coating material applied by the two respective cold end coating steps, this could be the same coating material or a different one for each respective cold end coating step.

The coating material can be an aqueous wax emulsion, either ionic or non ionic, depending on surfactants used for preparation said dispersions.

If the first cold end coating application step and the cold end coating application step applied when the containers are on a single line conveyer belt use the same coating material, it could be different in its composition concerning the solid content for example.

It is not outside of the scope of the invention to apply further coatings. Additional coating could be applied after the second cold and coating step, or before. Additional coating could be applied after the first cold and coating step, or before.

An efficient distribution of the cold end coating material yields to an improved scratch resistance over the critical areas of the container surface.

The coating line of the present invention could be implemented in the glass manufacturing industry and as well in a filling plant or the food processing industry.

[Methods of Evaluation]
Estimation of the Scratch Resistance

Two bottles are fixed and positioned in such way that the shoulder, body or heel is checked for their scratch resistance. A pneumatic cylinder applies an adjustable force (F1) on the bottles while one of the bottles is moving both ways versus the other static bottle.

Censors contentiously measure both the applied force and the due to the movement parallel force (F2) on the static bottle holder. Last one is depending on friction between the bottles.

When the coating is in good shape the friction is low but increases when the coating abrades. Finally the bottles will scratch which results into a strong increase of parallel measured force. The amount of movements in combination with the applied force qualifies the scratch resistance. Typical applied force is F1=200 N, a proper coating survives at least 100 movements.

The process of scratch resistance measurement is monitored and stored on a PC and during or afterwards the coefficient of friction (F2/F1) and its changes can be checked.

Four measurements are made and an average is calculated and given in the respective tables. If no scratching (strong increase of the measured force) is observed the evaluation is stopped after 1000 movements.

Estimation of the Slip Angle

The slip angle is estimated with a tilt table from the company AGR International Inc. The tilt table measures the angle when a bottle slips in contact with an identical glass surface. This gives an appreciation of the lubricity of the surface. Three glass containers are placed on the table in a pyramidal configuration. After the start button is pushed, an electric motor increases the angle of inclination of the table upon which the pyramid of bottles is resting at a rate of 3.6° per second. The bottom two bottles are constrained and do not move during testing.

The top container is free to slide and when the tilt angle becomes great enough to overcome the frictional forces between the containers, it begins to slide and contacts a trip bar. When the bottle depresses the trip bar, a switch is opened in the electronic circuitry of the Tilt Table simultaneously stopping the drive motor and applying a brake to the inclined table. This feature prevents coasting and inadvertent measurement of erroneously high tilt angles. The lubricity of the test containers can be expressed either by the angle at which sliding occurs or by the coefficient of static friction. Both measurements can be obtained from a scale on the front of the table. If the slip angle is less then 15°, preferably less then 13° it is considered that the bottle has been lubricous enough.

Estimation of Surface Tension

The surface tension is measured with test inks from Softal electronic GmbH according to DIN ISO 8296. The surface tension values are given Nm/m. If the surface tension is high, meaning more the 54 Nm/m, no or not sufficient lubricating cold end coating has been applied.

EXAMPLES 50 cl green glass or flint glass water bottles were used. The bottles had a hot end coating of 40 CTU, but also bottles with a 50 CTU hot end coating were also used.

Before further coating application all bottles were burned off at 575° C. for 20 min in order to remove all organic substance.

As coating cold end coating material Tegoglas RP40LT and Tegoglas 3000plus from ARKEMA were used.

The coating was applied with a spray gun Walter Pilot WA XV from Walther Spritz- and Lackiersysteme GmbH.

The coating was applied from a vertical position (v) for simulating the application of the cold end coating to the containers from above or from a horizontal position (h) with a spray nozzle more or less perpendicular (15° angle) to the to be coated bottle surface for simulating the application of the cold end coating from the side or a combination of the two.

The scratch resistance was evaluated 24 hours after the application of the cold end coating.

TABLE 1

Coating application with one perpendicular spray gun of 2 ml of solution of Tegoglas RP40LT or Tegoglas 3000plus at different positions of the spray guns

|  | Comparative Example 1 | Example 1 | Example 2 | Example 3 |
|---|---|---|---|---|
| Position of the spray guns for CEC application V = vertical at 125° C. container temperature and H = horizontal at 50° C. container temperature | | | | |
|  | V | H | V + H | V + H |
| Tegoglas RP40LT | V 0.5 wt % | H 0.5 wt % | V 0.1 wt % H 0.5 wt % | V 0.1 wt % |
| Tegoglas 3000plus | — | — | — | H 0.5 wt % |
| Average number of movements scratch resistance test at F = 200 N | | | | |
| Shoulder (2) | 5 | 7 | 17 | 40 |
| Body (3) | 9 | 18 | 800 | 788 |
| Heel (4) | 5 | 21 | 579 | 575 |
| Average | 6 | 15 | 465 | 467 |
| Slip angle [°] | | | | |
|  | 19 | 11 | 9 | 10 |
| Surface tension [Nm/m] | | | | |
| Neck (5) | 38 | 52 | 40 | 40 |
| Body (3) | >54 | 40 | 40 | 40 |

Table 1 shows that the horizontal application (perpendicular to the bottle surface) either alone (example 1) or in combination with vertical application (example 2 and 3) allows a more efficient application of the cold end coating: a higher average number of movements for the scratch resistance, a lower slip angle and a lower surface tension at the body.

TABLE 2

Coating application with one spray gun of 2 ml of 0.5 wt % solution of Tegoglas 3000plus at different positions of the spray guns

|  | Comparative Example 2 | Comparative Example 3 | Example 4 | Example 5 |
|---|---|---|---|---|
| Position of the spray guns for CEC application V = vertical at 125° C. container temperature and H = horizontal at 50° C. container temperature | | | | |
|  | V | V | H | V + H |
| Average number of movements scratch resistance test at F = 200 N | | | | |
| Shoulder (2) | 7 | 5 | 19 | 292 |
| Body (3) | 55 | 5 | 762 | 723 |
| Heel (4) | 5 | 5 | 821 | 155 |
| Average | 22 | 5 | 534 | 390 |
| Slip angle [°] | | | | |
|  | 12 | 20 | 10 | 9 |
| Surface tension [Nm/m] | | | | |
| Body (3) | 42 | 52 | 38 | 38 |

Table 2 shows that the horizontal application (perpendicular to the bottle surface) either alone (example 4) or in combination with vertical application (example 5) allows a more efficient application of the cold end coating: a higher average number of movements for the scratch resistance, a lower slip angle and a lower surface tension.

TABLE 3

Coating application with one perpendicular spray gun of 2 ml of 0.5 wt % solution of Tegoglas 3000plus at different glass bottle temperatures

|  | Example 4 | Example 6 | Example 7 | Example 8 |
|---|---|---|---|---|
| Bottle temperature T during coating application/ [° C.] | | | | |
|  | 50 | 75 | 100 | 125 |
| Average number of movements scratch resistance test at F = 200 N | | | | |
| Shoulder (2) | 19 | 323 | 16 | 59 |
| Body (3) | 762 | >1000 | >1000 | >1000 |
| Heel (4) | 821 | >1000 | 289 | 543 |
| Average | 534 | 774 | 435 | 534 |
| Slip angle [°] | | | | |
|  | 10 | 7 | 6 | 9 |
| Surface tension [Nm/m] | | | | |
| Body (3) | 38 | 40 | 38 | 40 |

Table 3 shows that the coating application according to the present invention can be done over a wide temperature interval, allowing the application of the cold end coating also further done the coating line when the containers could already be colder.

TABLE 4

Selective coating application of 2 ml 0.5 wt % Tegoglass 300plus with multiple spray guns at 50° C. bottle temperature.

|  | Example 9 | Example 10 | Example 11 | Example 12 |
|---|---|---|---|---|
| Application at | (2) + (3) + (4) | (4) | (3) | (2) |
| Average number of movements scratch resistance test at F = 200 N | | | | |
| Shoulder (2) | 764 | — | — | 608 |
| Body (3) | >1000 | — | >1000 | — |
| Heel (4) | >1000 | 733 | — | — |
| Surface tension [Nm/m] | | | | |
| Shoulder (2) | 36 | >54 | >54 | 38 |
| Body (3) | 36 | 38 | 38 | 40 |
| Heel (4) | 36 | 38 | 44 | >54 |

Table 4 shows that the coating application according to the present invention can be done selectively on certain areas of the container.

The invention claimed is:

1. A cold end coating line for containers comprising:
 a) a first means for spraying a first cold end coating application configured to apply said first cold end coating application from a first direction above of said containers,
 b) a second means for spraying a second cold end coating application configured to apply said second cold end application after the first cold end application and from a second direction from a side of said containers,
 c) a single line conveyer belt for applying said second cold end coatings to said containers, wherein the first and second means for spraying are further configured so that the two respective cold end coatings are applied from at least said first and second directions with an angle of at least 45° between the two directions when the containers are on the single line conveyer belt, means for maintaining a temperature of the containers at which the first cold end coating is applied and a temperature of the containers at which the second cold end coating application, which are applied at between 30 and 140° C., and wherein the first and second cold end coatings are aqueous wax emulsions.

2. A coating line according to claim 1 further comprising a hot end coating application before the first cold end coating application.

3. The coating line according to claim 1 wherein the first and second cold end coatings are applied by first and second spray means selected from the group consisting of spray gun and spray nozzle.

4. The coating line according to claim 3 wherein the spraying during the cold end coating application when the containers are on a single line conveyer belt is by one or more spray guns that are positioned perpendicular towards the to be coated outer wall of the containers.

5. The coating line according to claim 4 wherein the spray guns apply the cold end coating to a selective area of the container.

6. The coating line according to claim 4 wherein at least two spray guns are used during the cold end coating application applied when the containers are on a single line conveyer belt, each spray gun sprays on a different area of the container.

7. The coating line according to claim 6 wherein at least two different spray patterns are used by the spray guns on different areas of the container.

8. The coating line according to claim 1 wherein at least one of the first and second cold end coatings is applied by spray gun or spray nozzle.

9. The coating line according to claim 1 wherein the containers are hollow glass containers.

10. The coating line according to claim 1 wherein the temperature of the containers during the second cold end coating application is less then the temperature during the first cold end coating application.

11. The coating line according to claim 1 wherein the temperature of the container during the second cold end coating application is less than 140° C.

12. The coating line according to claim 1 wherein the coating line is located after the container manufacturing process.

* * * * *